US012210316B2

(12) United States Patent
Mitsui

(10) Patent No.: US 12,210,316 B2
(45) Date of Patent: Jan. 28, 2025

(54) IMAGE FORMING APPARATUS

(71) Applicant: CANON KABUSHIKI KAISHA, Tokyo (JP)

(72) Inventor: Yuji Mitsui, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/320,120

(22) Filed: May 18, 2023

(65) Prior Publication Data

US 2023/0384733 A1 Nov. 30, 2023

(30) Foreign Application Priority Data

May 27, 2022 (JP) ................................ 2022-086501

(51) Int. Cl.
*G03G 21/20* (2006.01)

(52) U.S. Cl.
CPC ... *G03G 21/206* (2013.01); *G03G 2221/1642* (2013.01)

(58) Field of Classification Search
CPC ... G03G 15/1665; G03G 21/20; G03G 21/206
USPC ........................................................... 399/92
See application file for complete search history.

(56) References Cited

U.S. PATENT DOCUMENTS

2015/0010322 A1* 1/2015 Nakazawa ........... G03G 21/206 399/92
2018/0239298 A1* 8/2018 Yabuki ................. G03G 21/206

FOREIGN PATENT DOCUMENTS

JP H0527612 A 2/1993
JP 2009258444 A 11/2009
JP 2015049394 A 3/2015

* cited by examiner

*Primary Examiner* — Hoang X Ngo
(74) *Attorney, Agent, or Firm* — Canon U.S.A., Inc. IP Division

(57) ABSTRACT

An image forming apparatus for forming an image on a sheet includes a rotatable image bearing member, a transfer roller, a fan, and a duct. The duct extends in a parallel direction to a shaft direction of the transfer roller and includes an inflow port to guide air. The duct further includes, in an area opposing the transfer roller, a first opening portion that is provided at a position closer to a first end side of the duct than to a second end side of the duct, and a second opening portion that is provided at a position closer to the second end side than to the first end side, in the parallel direction. The air supplied to the duct by the fan through the inflow port passes through the first opening portion and the second opening portion, and is supplied to the transfer roller.

11 Claims, 19 Drawing Sheets

IMAGE FORMING APPARATUS

BACKGROUND

Field

The present disclosure relates to an image forming apparatus for forming an image on a sheet.

Description of the Related Art

Image forming apparatuses such as copying machines and printers are used in various situations. For example, the users range from a small number of users who print on a small number of sheets to a large number of users who print on a large number of sheets. In the case of printing on a large number of sheets, an image forming apparatus may be operated continuously to perform continuous printing.

To handle the continuous printing, it is necessary to cool down heat generation members including a cartridge, and heated components. Japanese Patent Application Laid-Open No. H05-27612 discusses a configuration for cooling down a transfer roller.

SUMMARY

The present disclosure is directed to an image forming apparatus capable of cooling down a transfer roller.

According to an aspect of the present disclosure, an image forming apparatus for forming an image on a sheet includes a rotatable image bearing member configured to bear a toner image, a transfer roller configured to transfer the toner image from the rotatable image bearing member onto the sheet, a fan, and a duct extending in a parallel direction to a shaft direction of the transfer roller, wherein the duct includes an inflow port on a first end side of the duct in the parallel direction and is configured to guide, from the first end side to a second end side of the duct, air that has flowed into the duct through the inflow port, wherein the duct further includes, in an area opposing the transfer roller, a first opening portion that is provided at a position closer to the first end side than to the second end side, and a second opening portion that is provided at a position closer to the second end side than to the first end side, in the parallel direction, and wherein the air supplied to the duct by the fan through the inflow port passes through the first opening portion and the second opening portion, and is supplied to the transfer roller.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the attached drawings. Dimensions, materials, shapes of components and relative arrangements thereof described in the exemplary embodiments can be changed appropriately depending on the configuration of an apparatus to which any of the exemplary embodiments is applied and various conditions.

Overall Configuration

Figure 1:
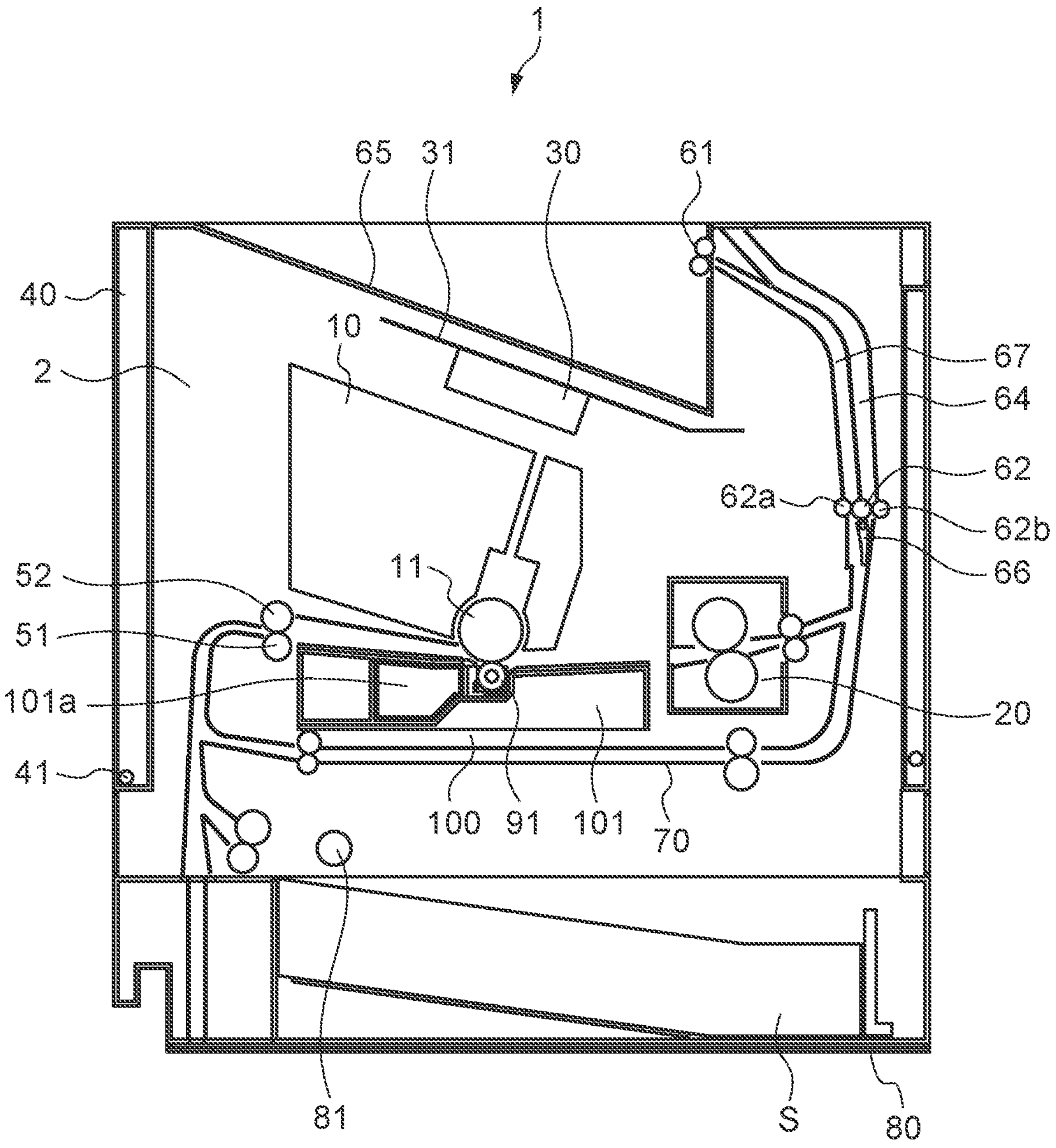
FIG. 1 is a view illustrating an overall configuration of an image forming apparatus (a laser beam printer) according to a first exemplary embodiment.

An overall configuration of an image forming apparatus 1 according to a first exemplary embodiment will be schematically described with reference to FIG. 1. FIG. 1 illustrates an overall configuration of a laser beam printer, which is an example of the image forming apparatus 1 according to the present exemplary embodiment. In the image forming apparatus 1 illustrated in FIG. 1, a sheet feed cassette 80 storing sheets S and serving as a sheet storage unit is disposed at the bottom, and is detachably attached to a main body of the image forming apparatus 1.

In the description of the configuration of the image forming apparatus 1, a left side surface of the main body in FIG. 1 is defined as a front side of the image forming apparatus 1. In addition, a front side surface of the main body in FIG. 1 (a surface of the main body seen from the drawing surface of FIG. 1) is defined as a right side of the image forming apparatus 1, a back side surface of the main body in FIG. 1 that opposes the front side surface is defined as a left side of the image forming apparatus 1, and the direction of the drawing surface of FIG. 1 (a shaft direction to be described below) is defined as a width direction of the main body.

In the main body of the image forming apparatus 1, a pickup roller 81 is provided to feed the sheets S placed in the sheet feed cassette 80 one by one from the sheet feed cassette 80 to the inside of the main body. A conveyance roller 51 and a conveyance opposing roller 52 are also disposed in the main body to receive the sheet S fed by the pickup roller 81 and further convey the sheet S to the downstream side.

A duplex conveyance path 70 is disposed above the sheet feed cassette 80, and a core frame unit 100 is disposed above the duplex conveyance path 70. The core frame unit 100 includes a core frame 101 and fixed to a left frame 2. A process cartridge 10 is disposed above the core frame unit 100. The process cartridge 10 includes a photosensitive drum 11 that is rotatable and serves as an image bearing member for bearing a toner image.

The core frame 101 includes a transfer roller 91 disposed below the process cartridge 10 and opposing the photosensitive drum 11. The transfer roller 91 is configured to rotate while nipping the sheet S in cooperation with the photosensitive drum 11 and transfer the toner image borne on the photosensitive drum 11 onto the sheet S.

A laser scanner unit 30 for forming an electrostatic latent image on the photosensitive drum 11 is disposed above the process cartridge 10. A scanner frame 31 is disposed on an upper surface of the laser scanner unit 30, and the laser scanner unit 30 is fixed to the scanner frame 31. A front door 40 is disposed to the left of the process cartridge 10 in FIG. 1 and is rotatable with a front door rotation center 41 as an axis.

A fixing unit 20 is disposed downstream of the photosensitive drum 11 and the transfer roller 91 in a conveyance direction of the sheet S. A duplex switching flapper 66, a switchback roller 62, a sheet discharge roller 62*a*, and a duplex switchback roller 62*b* are disposed downstream of the fixing unit 20 in the conveyance direction of the sheet S, and a sheet discharge roller pair 61 is disposed thereabove. A central processing unit (CPU) is included in a control unit (not illustrated) of the image forming apparatus 1, and comprehensively controls the image forming operation of the image forming apparatus 1.

Figure 2:
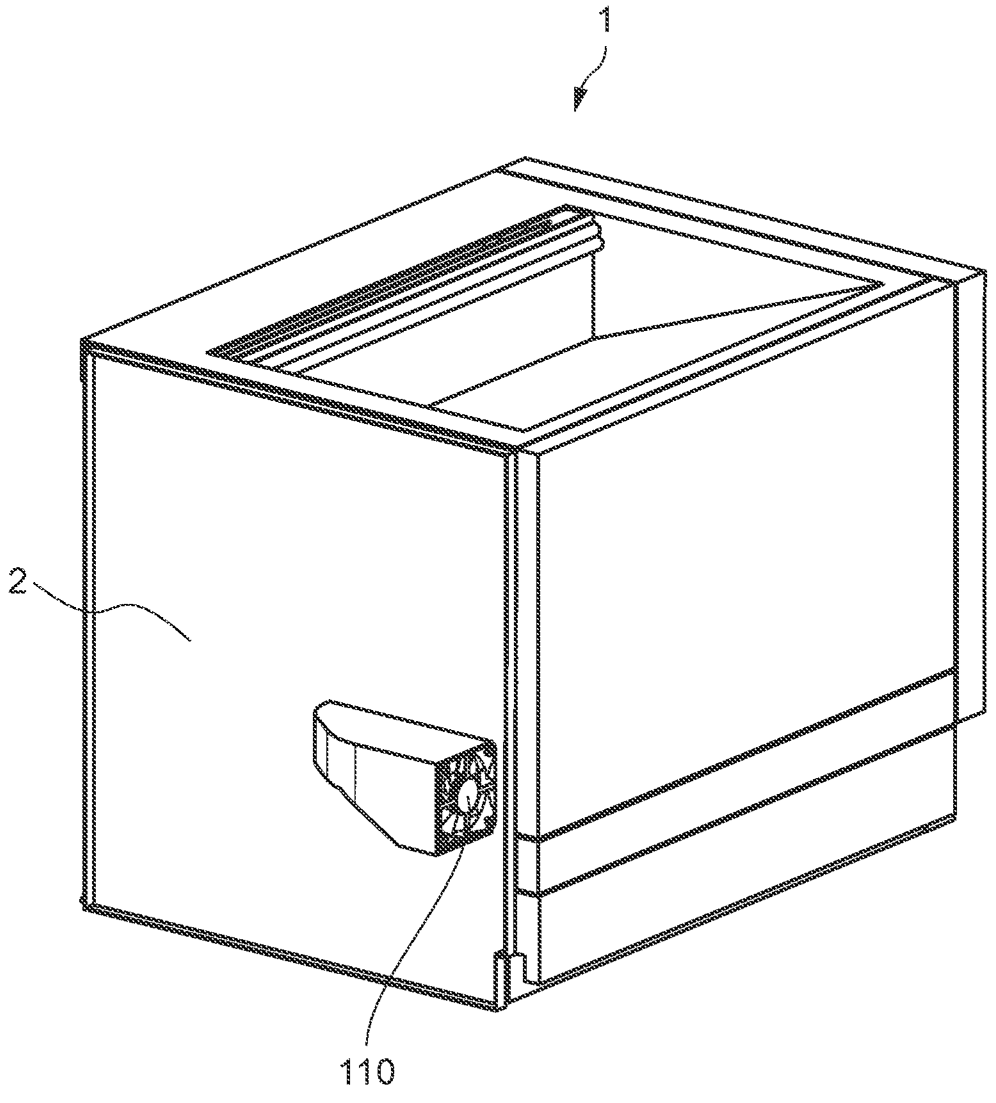
FIG. 2 is a perspective view illustrating the image forming apparatus according to the first exemplary embodiment with an outer casing removed therefrom.

FIG. 2 is a perspective view illustrating the image forming apparatus 1 with an outer casing removed therefrom. A fan 110 serving as an air blowing unit is provided on the left frame 2 of the image forming apparatus 1, and sends air from the outside of the image forming apparatus 1 to the inside of the main body. The fan 110 sends air into a duct 101*a* (see FIG. 1) so that the air is flown from one end side of the duct 101*a* to the other end side of the duct 101*a*. In the present exemplary embodiment, the air supplied from the fan 110 cools downs the transfer roller 91 and also cools down the photosensitive drum 11 via the transfer roller 91. The need to cool down the photosensitive drum 11 will now be described. The photosensitive drum 11 can easily rise in temperature due to friction with a cleaning blade (not illustrated) during image formation. The photosensitive drum 11 can also easily rise in temperature due to contact with the sheet S heated during duplex printing. If the temperature of the photosensitive drum 11 becomes too high, the toner on the photosensitive drum 11 is melted before reaching the fixing unit 20.

Thus, in the present exemplary embodiment, to cool down the photosensitive drum 11, the transfer roller 91 in direct contact with the photosensitive drum 11 or in contact with the photosensitive drum 11 via the sheet S is cooled down. Cooling down the transfer roller 91 enables cooling down the photosensitive drum 11, which prevents the temperature of the photosensitive drum 11 from becoming too high and melting the toner.

Printing Operation

Referring to FIG. 1, a user first places the sheets S in the sheet feed cassette 80, and instructs the image forming apparatus 1 to start a printing operation. At this time, the fan 110 starts rotating in order to cool down the photosensitive drum 11 that rises in temperature during the printing operation, and starts sending the air taken in from outside the image forming apparatus 1 into the image forming apparatus 1.

The sheet S is fed from the sheet feed cassette 80 by the pickup roller 81, and reaches the conveyance roller 51 and the conveyance opposing roller 52. The sheet S (the recording material) is further conveyed by rotation of the conveyance roller 51 and the conveyance opposing roller 52. At this time, a toner image is developed on the photosensitive drum 11 in synchronization with the operation of feeding the sheet S.

The sheet S then enters into a nip portion formed by the photosensitive drum 11 and the transfer roller 91.

At the nip portion formed by the photosensitive drum 11 and the transfer roller 91, the toner image formed on the photosensitive drum 11 is transferred onto the sheet S. The toner image transferred to the sheet S is heated and pressed by the fixing unit 20 including a fixing roller, whereby the toner is melted and fixed on the sheet S.

In the case of one-sided printing, the sheet S with the image fixed thereon reaches the duplex switching flapper 66, is conveyed to a sheet discharge conveyance path 67 by the switchback roller 62 and the sheet discharge roller 62*a*, and then reaches the sheet discharge roller pair 61. The sheet discharge roller pair 61 then discharges the sheet S to a sheet discharge tray 65 and the image forming operation ends. The rotation of the fan 110 stops when the image forming operation ends.

In the case of two-sided printing, a drive source (not illustrated) changes the state of the duplex switching flapper 66 to guide the sheet S with the image fixed thereon toward the switchback roller 62 and the duplex switchback roller 62*b*. The sheet S is then conveyed to a switchback conveyance path 64 by the switchback roller 62 and the duplex switchback roller 62*b*.

The switchback roller 62 and the duplex switchback roller 62*b* stop before the trailing edge of the sheet S reaches a nip portion formed by the switchback roller 62 and the duplex switchback roller 62*b*, and then start rotating reversely. The sheet S is then conveyed to the duplex conveyance path 70.

The sheet S passes through the duplex conveyance path 70, is conveyed again to the conveyance roller 51 and the conveyance opposing roller 52, and printing is performed on the second side of the sheet S. Thereafter, the same operation as that in the one-sided printing is performed.

Figure 3:
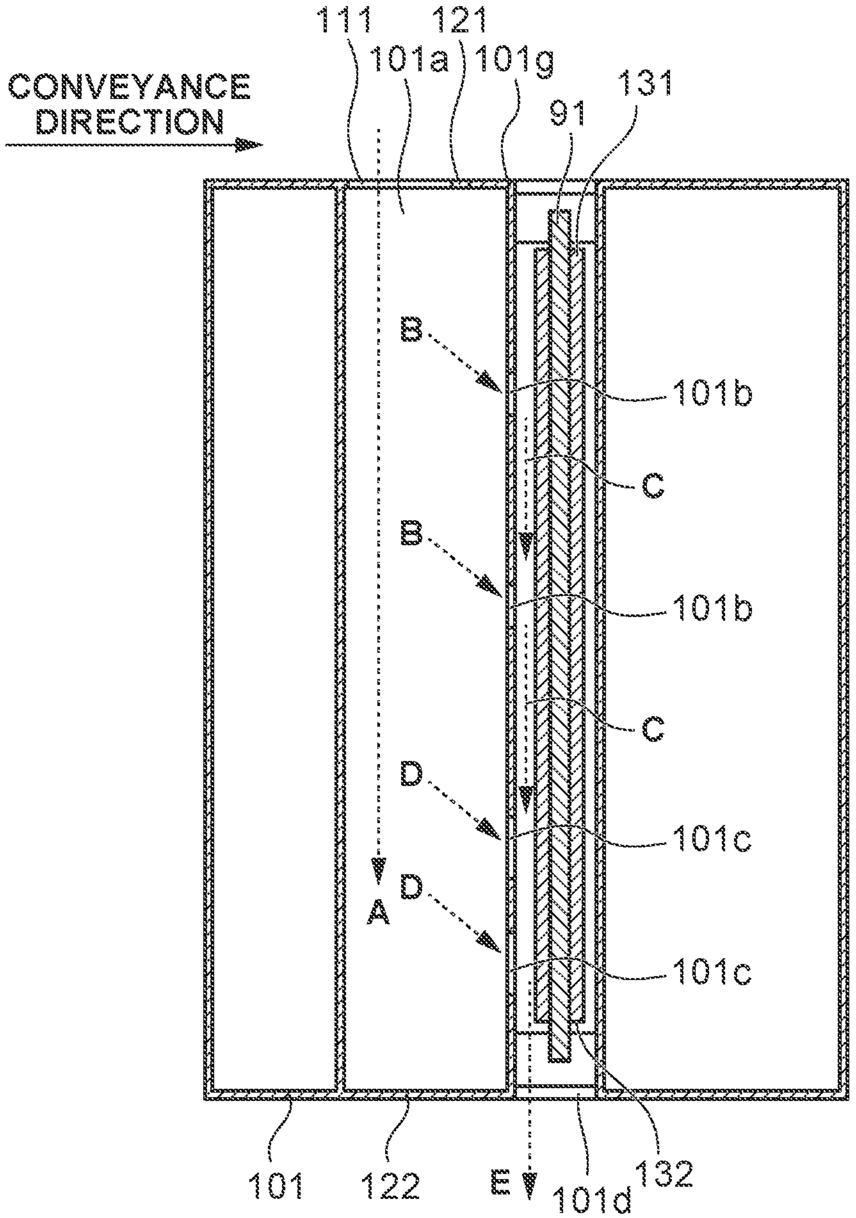
FIG. 3 is a top view illustrating a core frame according to the first exemplary embodiment.

The fan 110 sends air into the duct 101*a* through an inflow port 111 (see FIG. 3). The air sent from the fan 110 is guided by the duct 101*a* along the shaft direction of the transfer roller 91. The duct 101*a* extends in a direction parallel to the shaft direction of the transfer roller 91, has one end 121 and the other end 122, and is adjacent to the transfer roller 91. The transfer roller 91 also has one end 131 and the other end 132.

Figure 6:
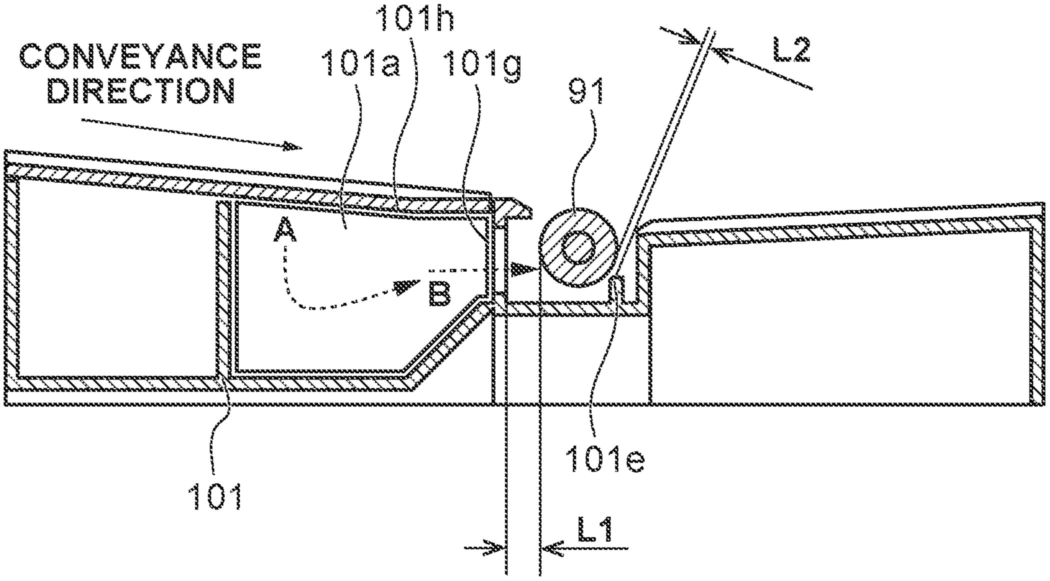
FIG. 6 is a cross-sectional view illustrating the core frame according to the first exemplary embodiment.

The inflow port 111 is provided on one end side of the duct 101*a* in a direction parallel to the shaft direction of the transfer roller 91. The air flowing into the duct 101*a* through the inflow port 111 is guided by the duct 101*a* from the one end side toward the other end side. In the present exemplary embodiment, the one end side indicates a position closer to the one end 121 than to the other end 122, and the other end side indicates a position closer to the other end 122 than to the one end 121. The same applies to the transfer roller 91. As illustrated in FIG. 6 (described below), the duct 101*a* includes a first guide portion 101*g* and a second guide portion 101*h*. The first guide portion 101*g* forms an outer surface of the duct 101*a* at a position opposing the transfer roller 91. The second guide portion 101*h* forms a conveyance path for conveying the sheet S and also forms the outer surface of the duct 101*a*. In the present exemplary embodiment, "opposing" may not necessarily mean directly opposing the transfer roller 91. It also means a state where another member is present between the duct 101*a* and the transfer roller 91 and at least a part of the surface forming the duct 101*a* faces the transfer roller 91.

FIG. 3 is a top view illustrating the core frame 101 holding the transfer roller 91. As illustrated in FIG. 3, the air flows into the duct 101*a* through the inflow port 111 as indicated by an arrow A.

As indicated by arrows B, a part of the air flows toward the transfer roller 91 through holes 101*b* (first openings) serving as a first opening portion provided on one end side of the first guide portion 101*g* of the duct 101*a*, and cools down the transfer roller 91. The air then flows in a direction indicated by arrows C.

As indicated by arrows D, a part of the air that has flowed into the duct 101*a* flows toward the transfer roller 91 through holes 101*c* (second openings) serving as a second opening portion provided on the other end side of the first guide portion 101*g*, and cools down the transfer roller 91. The air then joins the air that has entered through the holes 101*b* and cooled down the transfer roller 91, flows as indicated by an arrow E, and passes out through a discharge portion 101*d* of the core frame 101.

The discharge portion 101*d* is a hole for discharging the air guided by the duct 101*a* to the outside of the image forming apparatus 1, and is provided at the other end side of the transfer roller 91.

The length of the duct 101*a* in the shaft direction of the transfer roller 91 is longer than the length of the transfer roller 91. The one end 121 of the duct 101*a* is located at a position farther from the other end 122 of the duct 101*a* than the one end 131 of the transfer roller 91 in the shaft direction of the transfer roller 91. The other end 122 of the duct 101*a* is located at a position farther from the one end 121 of the duct 101*a* than the other end 132 of the transfer roller 91 in the shaft direction of the transfer roller 91. In the present exemplary embodiment, the number of the holes 101*b* serving as the first opening portion is two and the number of the holes 101*c* serving as the second opening portion is two.

If a hole through which the air moves from the duct 101*a* to the transfer roller 91 is provided at only one position on the upstream side of the duct 101*a*, the temperature of the air that has cooled down the transfer roller 91 on the upstream side becomes high, and the air is unable to cool down the transfer roller 91 enough on the downstream side. To address this issue, by adjusting the positions and areas where the hole is provided, a given portion of the transfer roller 91 can be specifically cooled down. In the present exemplary embodiment, the total area of the two holes 101*c* serving as the second opening portion is made larger than the total area of the two holes 101*b* serving as the first opening portion.

This is because the air pressure is high on the one end side of the duct 101*a* because the distance to the fan 110 is shorter, and the air amount flowing through the holes 101*b* on the one end side of the duct 101*a* and the air amount flowing through the holes 101*c* on the other end side of the duct 101*a* are different from each other. In the present exemplary embodiment, the configuration in which the core frame 101 includes two sizes of holes, i.e., the holes 101*b* and the holes 101*c* is described, but the number of sizes of the openings can be three or more. Further, the air amount can be adjusted by changing the numbers of the holes 101*b* and the holes 101*c*, or the distances between the openings of the holes 101*b* and between the openings of the holes 101*c*.

It is possible to cool down the transfer roller 91 more efficiently with the configuration in which the total area of the holes 101*c* serving as the second opening portion is made larger than that of the holes 101*b* serving as the first opening portion. Alternatively, two or more of the holes 101*b* or two or more of the holes 101*c* can be provided. In the configuration according to the present exemplary embodiment, the two holes 101*b* and the two holes 101*c* are provided. By providing the first and second openings at different positions in the shaft direction of the transfer roller 91, it is possible to send the air having a low temperature to the transfer roller 91 through each of the first and second openings, and to evenly cool down the transfer roller 91.

Alternatively, three or more holes 101*b* and three or more holes 101*c* can be provided. Further alternatively, the holes 101*b* can be provided at different positions in the shaft direction of the transfer roller 91, and the holes 101*c* can be provided at different positions in the shaft direction of the transfer roller 91. Further alternatively, the holes 101*b* can be different in distance therebetween, and the holes 101*c* can be different in distance therebetween.

In the present exemplary embodiment, the total area of the holes 101*c* is made larger than that of the holes 101*b*, but depending on conditions, for example, a condition where the one end side of the transfer roller 91 is close to a heat source and more likely to be high in temperature, the total area of the holes 101*c* can be made smaller than that of the holes 101*b*.

The transfer roller 91 cooled down by the air then cools down the photosensitive drum 11 in contact therewith. At the same time, the transfer roller 91 cooled down by the air cools down the sheet S being conveyed. In particular, the sheet S to be subjected to the two-sided printing is higher in temperature than the sheet S in printing on the first side (the front side) because the sheet S has already passed through the fixing unit 20 once. By cooling down the sheet S using the transfer roller 91, it is possible to prevent the heat of the sheet S having a high temperature from transferring to the photosensitive drum 11, and to prevent the temperature rise of the photosensitive drum 11.

As illustrated in FIG. 6 (described below), the duct 101*a* is located upstream of the transfer roller 91 in the conveyance direction of the sheet S, and the second guide portion 101*h* (the sheet guide portion) forming the outer surface of the duct 101*a* also serves as a part of the conveyance path for conveying the sheet S. The air flowing through the duct 101*a* cools down the second guide portion 101*h*, whereby the sheet S passing the conveyance path is also cooled down. As a result, the heat of the sheet S is not easily transmitted to the photosensitive drum 11. While the duct 101*a* forms the conveyance path of the sheet S (includes the second guide portion 101*h*) in the above-described configuration, the duct 101*a* may not necessarily form the conveyance path of the sheet S.

Figure 4:
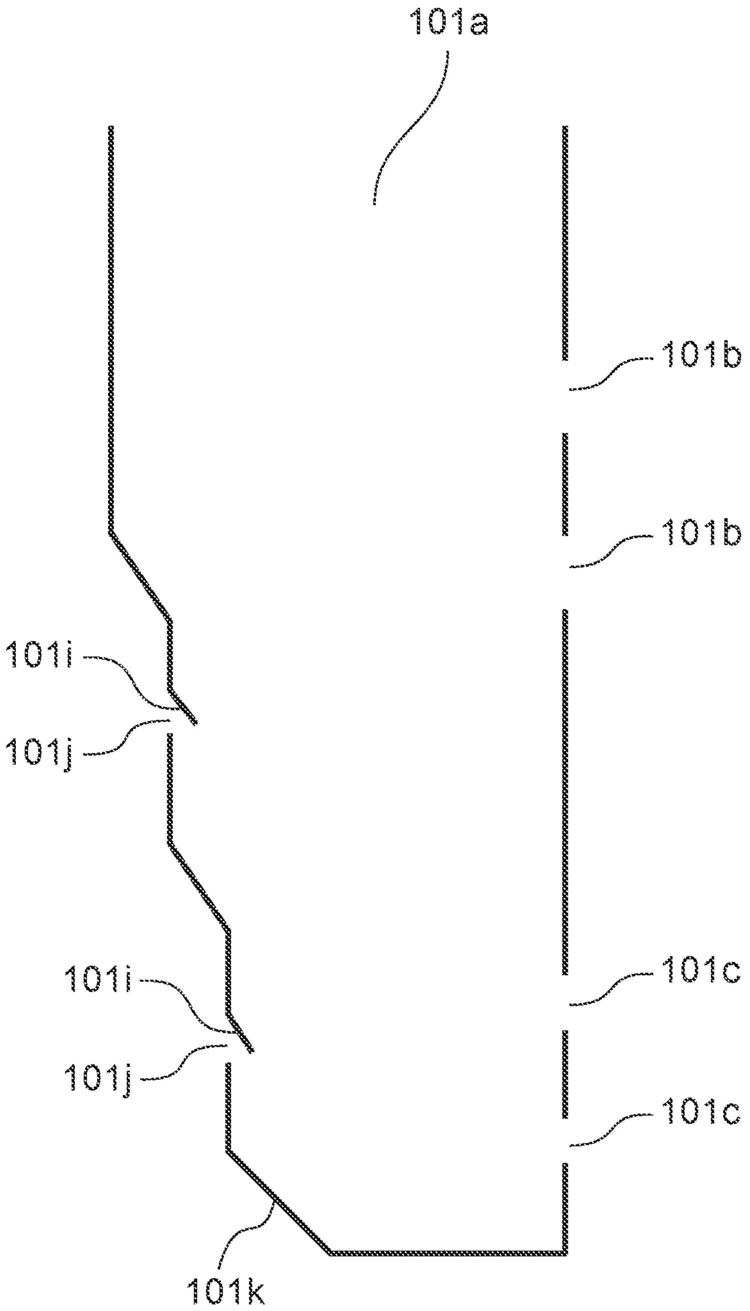
FIG. 4 is a top view illustrating a modification example of a duct according to the first exemplary embodiment.

FIG. 4 is a top view illustrating a modification example of the duct 101*a*. In the duct 101*a* illustrated in FIG. 4, the width of the passage of the duct 101*a* becomes gradually narrower. A slope portion 101*k* is also provided in the duct 101*a* on the downstream side of the duct 101*a* in an air traveling direction. By providing the slope portion 101*k* in this manner, the air flows smoothly on the downstream side of the duct 101*a*, and the resistance becomes smaller. As a result, the air amount flowing into the duct 101*a* can be increased.

The duct 101*a* also has multipurpose holes 101*j* and guide walls 101*i*. The multipurpose holes 101*j* do not aim at air discharge, and are provided in the duct 101*a* for structural reasons. For example, the multipurpose holes 101*j* are provided to allow a circuit wire bundle to pass therethrough or another member to overlap thereon.

The guide walls 101*i* are provided to reduce the amount of air to be discharged through the multipurpose holes 101*j*.

The guide walls 101*i* are inclined so that the air flowing in the duct 101*a* flows in a direction away from the multipurpose holes 101*j*. The amount of air to be discharged through the multipurpose holes 101*j* is reduced by the guide walls 101*i*.

Figure 5:
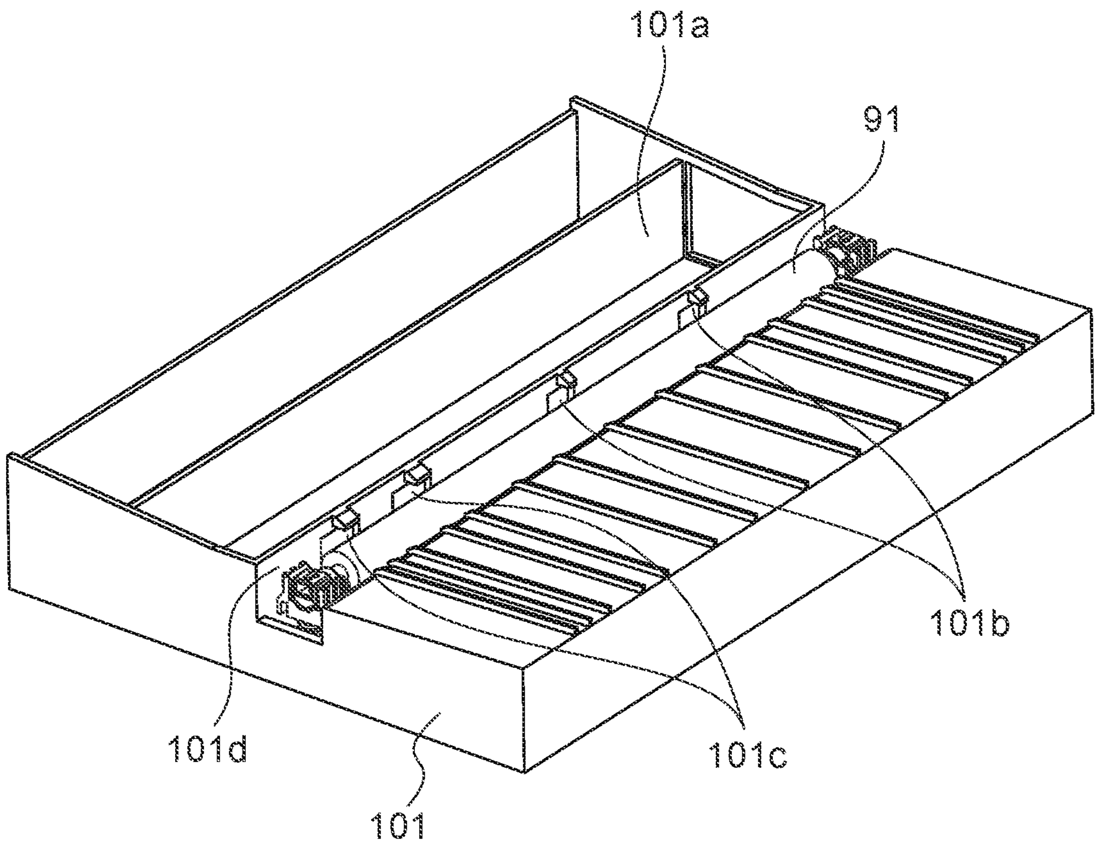
FIG. 5 is a perspective view illustrating the core frame according to the first exemplary embodiment.

FIG. 5 is a perspective view illustrating the core frame 101. The air flowing in the duct 101*a* is discharged to the outside of the image forming apparatus 1 through the discharge portion 101*d* after being discharged from inside the duct 101*a* through the holes 101*b* and the holes 101*c* and hitting the transfer roller 91. More specifically, the discharge portion 101*d* is a gap near a bearing on the other end side of the transfer roller 91.

FIG. 6 is a cross-sectional view of the core frame 101 seen from a direction perpendicular to the shaft of the transfer roller 91. Assume that a distance between the nearest points of each of the holes 101*b* and 101*c* and the transfer roller 91 is L1.

The core frame 101 includes a windshield wall 101*e*. Assuming that a distance between the nearest points of the windshield wall 101*e* and the transfer roller 91 is L2, the windshield wall 101*e* is provided by reducing the distance L2 in order to make the air less likely to leak through the gap between the windshield wall 101*e* and the transfer roller 91.

In this way, the windshield wall 101*e* prevents the air flowing in the directions indicated by the arrows C and the arrow E in FIG. 3 from passing under the transfer roller 91 and entering into the fixing unit 20 side, whereby it is possible to efficiently cool down the transfer roller 91. Further, the windshield wall 101*e* prevents the air from leaking to the downstream side in the conveyance direction of the sheet S to prevent the fixing unit 20 from being cooled down. More specifically, the distances L1 and L2 are each set to be 2 mm or less in the above-described configuration.

In the present exemplary embodiment, the fan 110 is disposed closer to the one end side than the inflow port 111, and configured to send air into the main body. Alternatively, any configuration for allowing air to flow into the duct 101*a*, for example, a configuration in which the fan 110 is disposed closer to the other end side than the discharge portion 101*d* to suction the air in the main body can be used.

Figure 7:
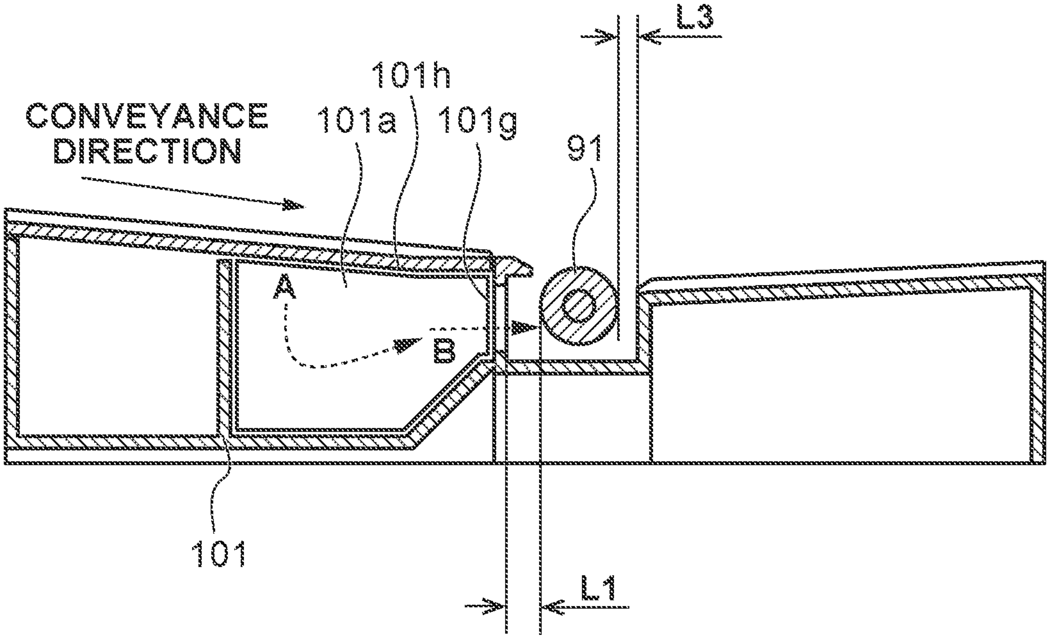
FIG. 7 is a cross-sectional view illustrating a modification example of the core frame according to the first exemplary embodiment.

FIG. 7 illustrates a modification example of the core frame 101. FIG. 7 illustrates a configuration in which the core frame 101 does not include the windshield wall 101*e*. As illustrated in FIG. 7, the core frame 101 can prevent the air from leaking out by sufficiently reducing a distance L3 between the downstream side of the transfer roller 91 in the conveyance direction of the sheet S and the core frame 101 instead of including the windshield wall 101*e*.

Figure 8:
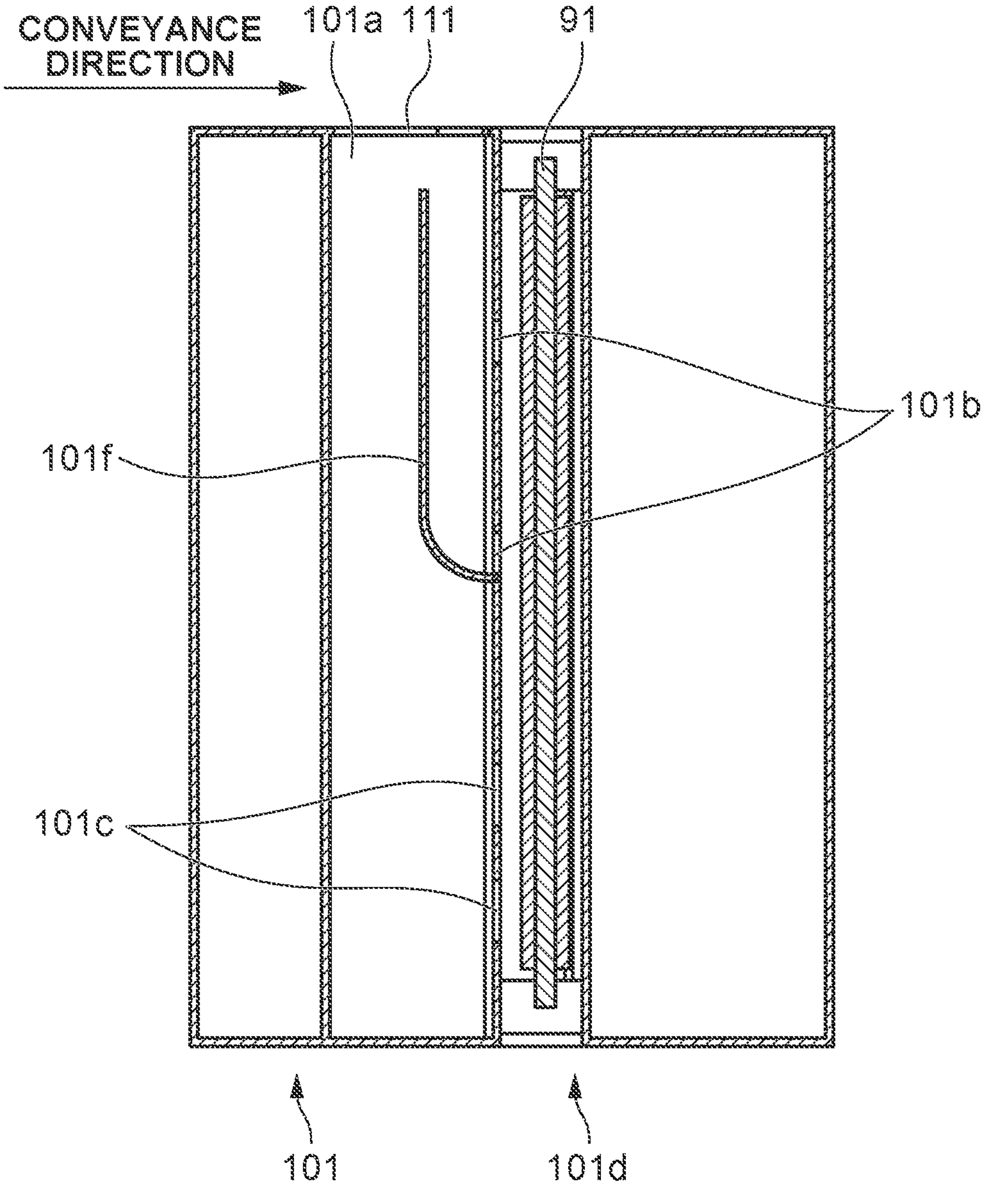
FIG. 8 is a top view illustrating the core frame according to the first exemplary embodiment which includes a rectifying plate.

FIG. 8 is a top view of the core frame 101 including a rectifying plate 101*f*. As illustrated in FIG. 8, the rectifying plate 101*f* can be provided in the duct 101*a* to adjust the amount of air flowing through the holes 101*b* and the holes 101*c*. With the above-described configuration, it is possible to effectively send air to the transfer roller 91 and cool down the transfer roller 91.

Next, a second exemplary embodiment will be described. The same configurations as those in the first exemplary embodiment are assigned the same reference numerals, and descriptions thereof will be omitted.

Overall Configuration

Figure 9:
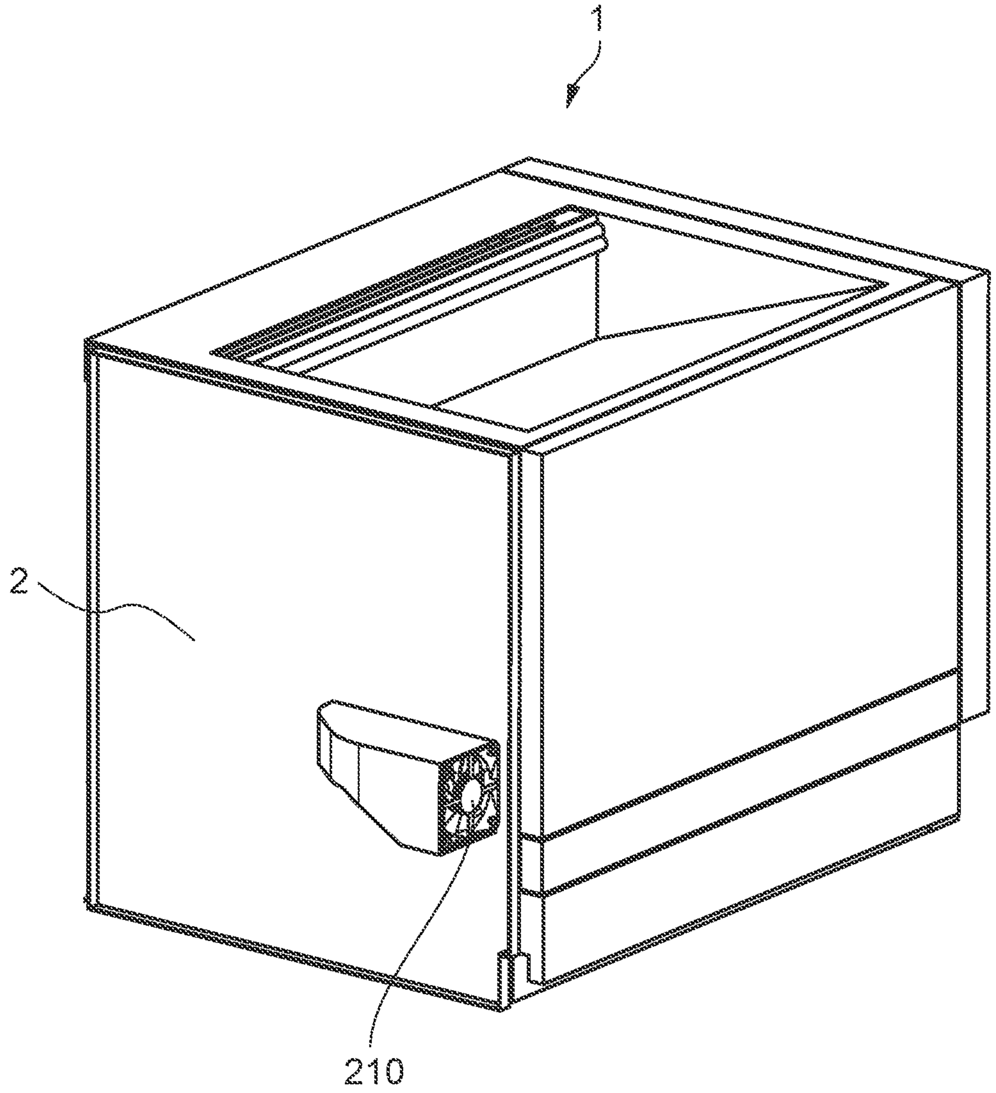
FIG. 9 is a perspective view illustrating an image forming apparatus according to a second exemplary embodiment with an outer casing removed therefrom.

FIG. 9 is a perspective view of the image forming apparatus 1 according to the present exemplary embodiment with an outer casing removed therefrom. A fan 210 is provided on the left frame 2 of the image forming apparatus 1, and discharges the air in the image forming apparatus 1 to the outside of the image forming apparatus 1 to cool down the transfer roller 91. A discharge portion 211 (see FIG. 10) for discharging the air in the duct 101*a* is also provided on the left frame 2. Similarly to FIG. 1, the duct 101*a* for guiding the air in the core frame 101 to the discharge portion 211 is provided on the left frame 2.

Printing Operation

Figure 10:
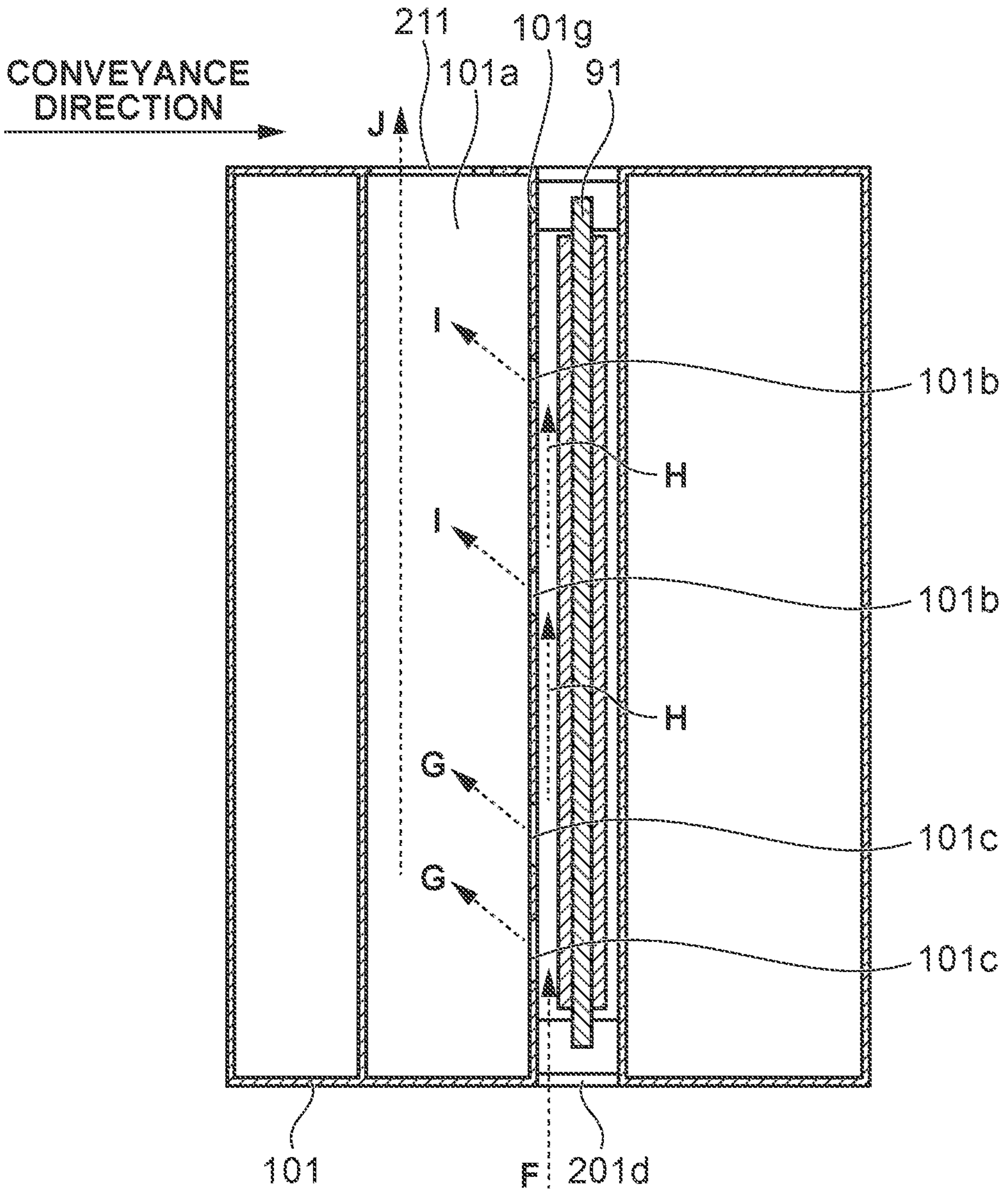
FIG. 10 is a top view illustrating a core frame according to the second exemplary embodiment.

The fan 210 continues suctioning the air in the image forming apparatus 1 during the image forming operation, and takes in the air outside the core frame 101 through an inflow port 201*d* of the core frame 101. FIG. 10 is a top cross-sectional view of the core frame 101. As illustrated in FIG. 10, the air that has flowed in through the inflow port 201*d* cools down the transfer roller 91, and flows in a direction indicated by an arrow F.

A part of the air that has cooled down the transfer roller 91 flows into the duct 101*a* through the holes 101*c* provided in the first guide portion 101*g*, and flows in a direction indicated by arrows G. Similarly, a part of the air that has flowed into the core frame 101 flows in a direction indicated by arrows H to cool down the transfer roller 91, flows into the duct 101*a* through the holes 101*b* provided in the first guide portion 101*g*, and flows in a direction indicated by arrows I.

The air that has flowed into the duct 101*a* in the direction indicated by the arrows G joins the air flowing in the direction indicated by the arrows I, flows in a direction indicated by an arrow J, and is discharged from the duct 101*a*. The transfer roller 91 cooled down in this way cools down the photosensitive drum 11 in contact therewith. The transfer roller 91 also cools down the sheet S being conveyed.

Figure 11:
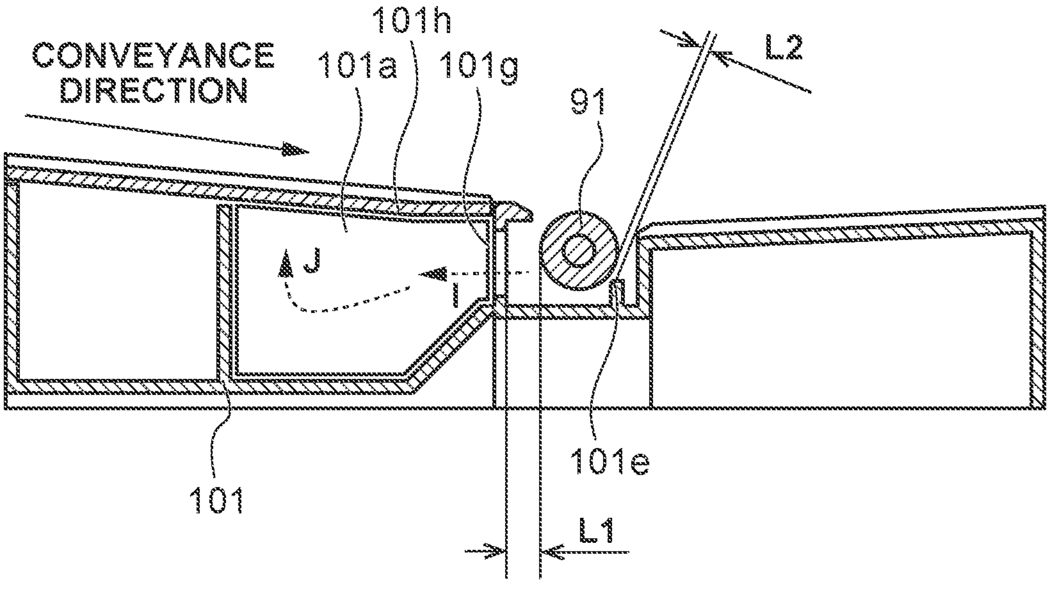
FIG. 11 is a cross-sectional view illustrating the core frame according to the second exemplary embodiment.

FIG. 11 is a cross-sectional view of the core frame 101 according to the present exemplary embodiment, seen from a direction perpendicular to the shaft of the transfer roller 91. The core frame 101 includes the windshield wall 101*e*. Assuming that the distance between the nearest points of the windshield wall 101*e* and the transfer roller 91 is L2, and the distance between the nearest points of each of the holes 101*b* and 101*c* and the transfer roller 91 is L1, the windshield wall 101*e* is provided at a position satisfying a relation of L1>L2.

In this way, the windshield wall 101*e* prevents the air flowing in the directions indicated by the arrow F and the arrows H in FIG. 10 from passing under the transfer roller 91 and entering into the fixing unit 20 side, whereby it is possible to efficiently cool down the transfer roller 91. Further, the windshield wall 101*e* prevents the air from leaking to the downstream side in the conveyance direction of the sheet S to prevent the fixing unit from being cooled down. More specifically, the distance L2 is set to 2 mm or less in the above-described configuration.

The downstream side of the duct 101*a* in the direction in which the air in the duct 101*a* flows, which is the upper side of FIG. 10, is closer to the fan 210 and higher in air pressure. For this reason, the amount of air suctioned through the holes 101*b* located on the one end side of the duct 101*a*, and the amount of air suctioned through the holes 101*c* located on the other end side of the duct 101*a* are different from each other. Thus, to evenly cool down the transfer roller 91, the opening amount of the holes 101*b* serving as the first opening portion and the opening amount of the holes 101*c* serving as the second opening portion are adjusted.

Similarly to the first exemplary embodiment, the distances between the openings can also be adjusted.

A third exemplary embodiment will be described. The same configurations as those in the first exemplary embodiment are assigned the same reference numerals, and descriptions thereof will be omitted.

Figure 12:
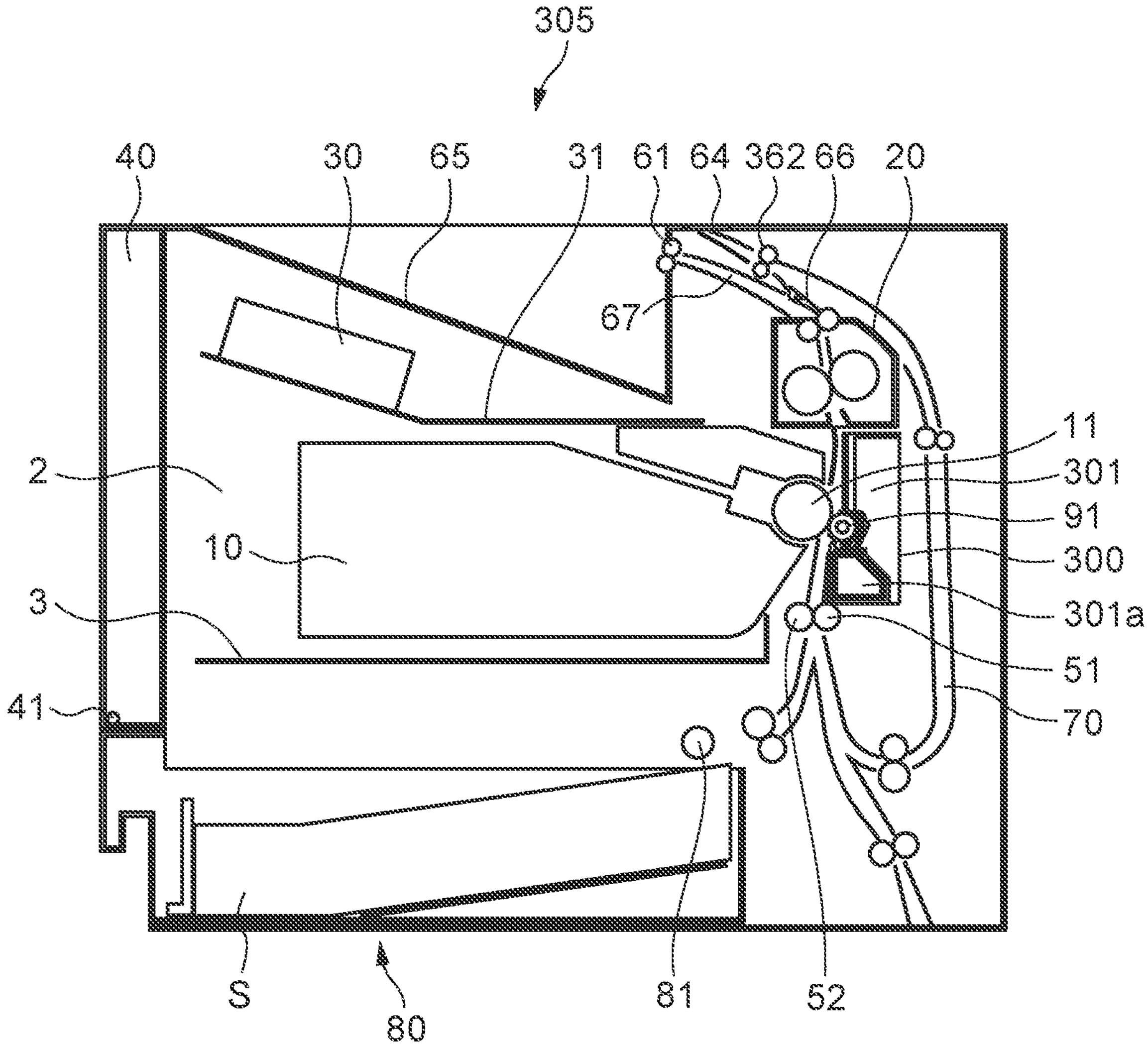
FIG. 12 is a view illustrating an overall configuration of an image forming apparatus according to a third exemplary embodiment.

With reference to FIG. 12, an overall configuration of an image forming apparatus 305 according to the present exemplary embodiment will be schematically described. FIG. 12 illustrates an overall configuration of a laser beam printer, which is an example of the image forming apparatus 305 different in configuration from the image forming apparatus 1 according to the first exemplary embodiment. In the image forming apparatus 305, the conveyance path of the sheet S is different from that in the image forming apparatus 1 according to the first exemplary embodiment, but the image forming operation thereof is similar to that of the image forming apparatus 1 according to the first exemplary embodiment.

Figure 13:
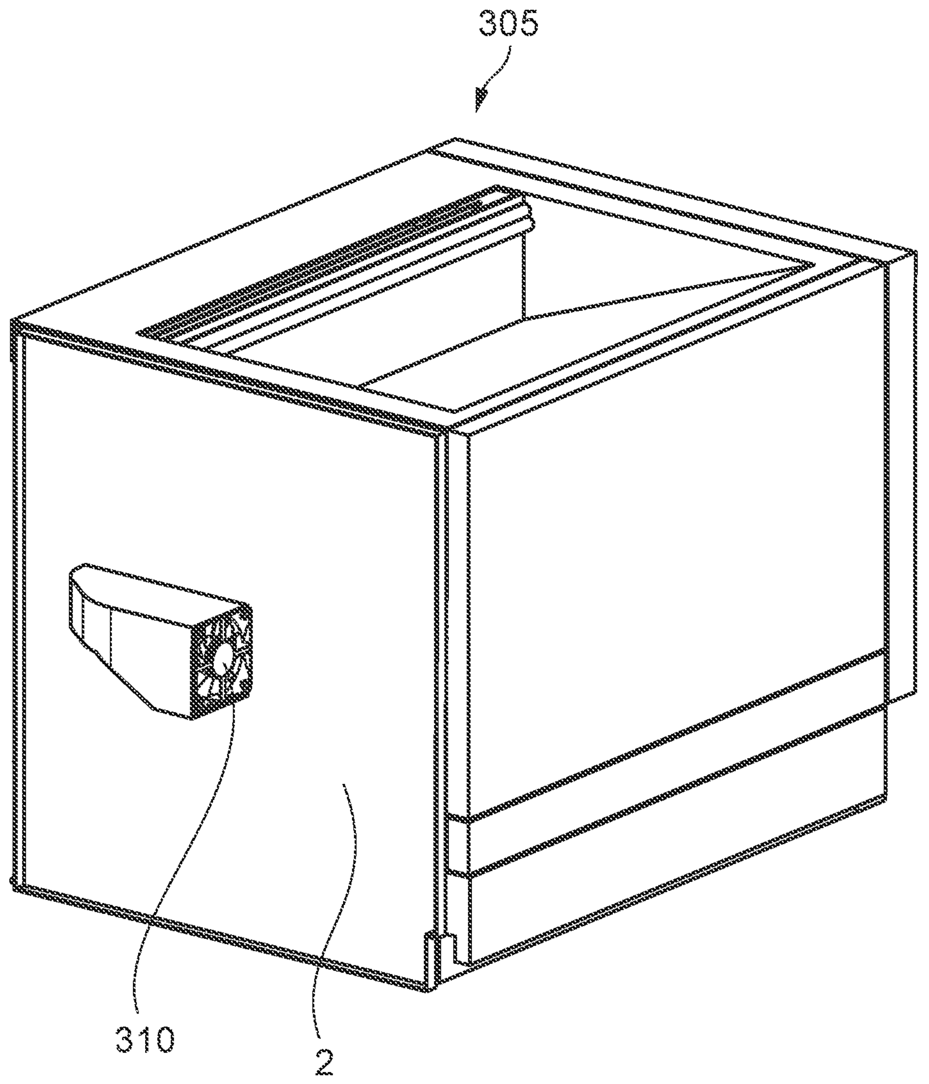
FIG. 13 is a perspective view illustrating the image forming apparatus according to the third exemplary embodiment with an outer casing removed therefrom.

FIG. 13 is a perspective view of the image forming apparatus 305 with an outer casing on the left side removed therefrom. A fan 310 is provided on the left frame 2, and takes the air outside a main body of the image forming apparatus 305 into the main body. The position of the fan 310 is different from that of the fan 110 according to the first exemplary embodiment because the fan 310 is different in internal configuration from the fan 110 according to the first exemplary embodiment.

Figure 14:
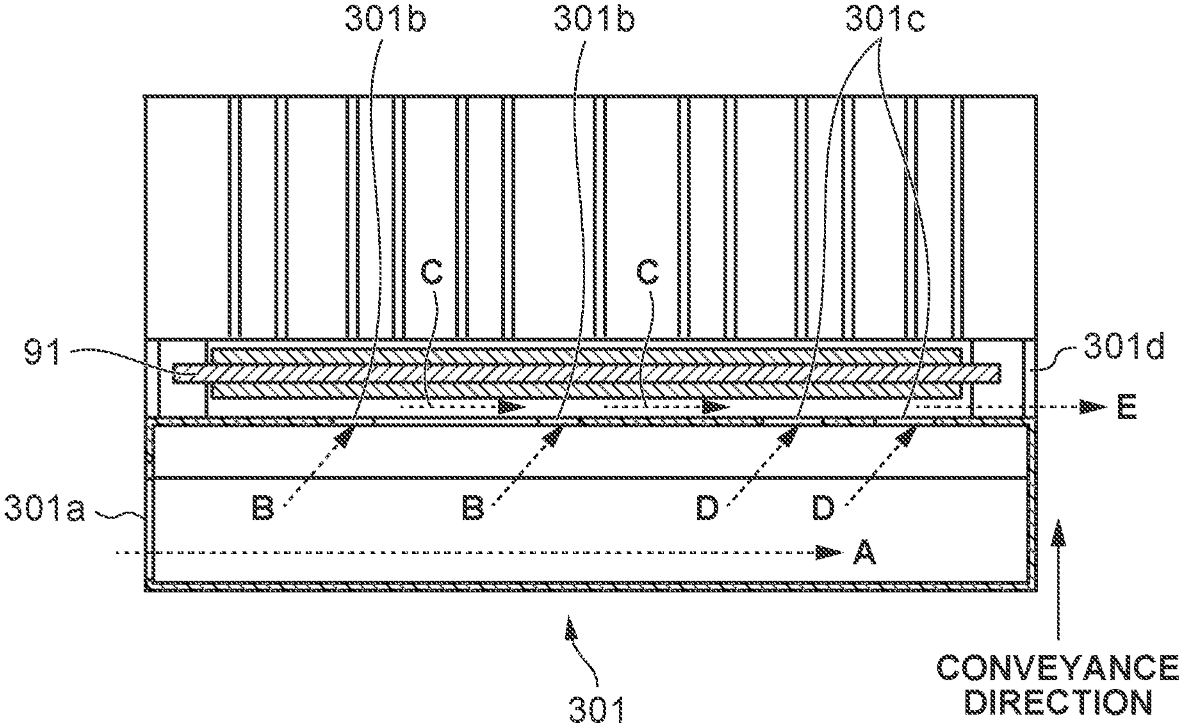
FIG. 14 is a cross-sectional view illustrating a core frame according to the third exemplary embodiment.
Figure 15:
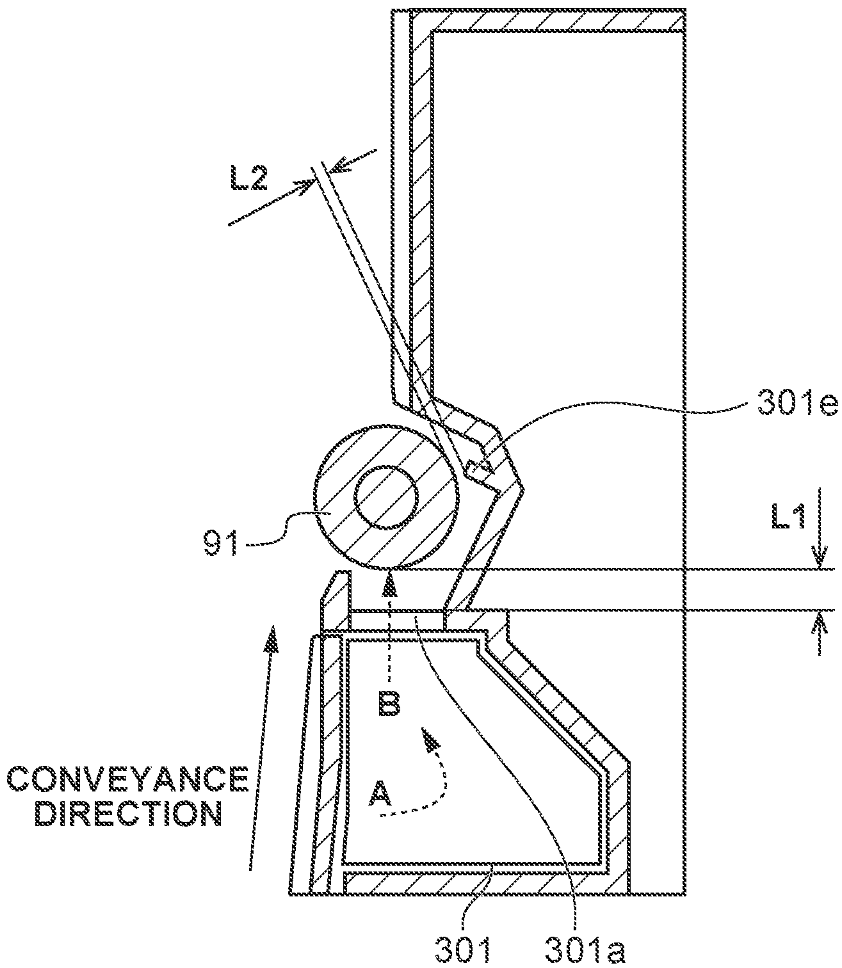
FIG. 15 is another cross-sectional view illustrating the core frame according to the third exemplary embodiment.

FIG. 14 is a cross-sectional view of a core frame 301 taken along the conveyance direction of the sheet S. The core frame 301 is included in a core frame unit 300 (see FIG. 12). While the duct 101*a* and the transfer roller 91 are arranged in a substantially horizontal direction in the first exemplary embodiment, a duct 301*a* and the transfer roller 91 are arranged in a vertical direction in the present exemplary embodiment. An air flow state is similar to that according to the first exemplary embodiment. Holes 301*b*, holes 301*c*, and a discharge portion 301*d* respectively correspond to the holes 101*b*, the holes 101*c*, and the discharge portion 101*d* according to the first exemplary embodiment. FIG. 15 is a cross-sectional view of the core frame 301 seen from a direction perpendicular to the shaft of the transfer roller 91.

Similarly to the first exemplary embodiment, the core frame 301 includes a windshield wall 301*e*, and the distances of L1 and L2 are similar to those according to the first exemplary embodiment.

As described above, the configuration can be implemented even though the conveyance path has a different shape.

A fourth exemplary embodiment will be described. The same configurations as those in the first exemplary embodiment are assigned the same reference numerals, and descriptions thereof will be omitted.

Overall Configuration

Figure 16:
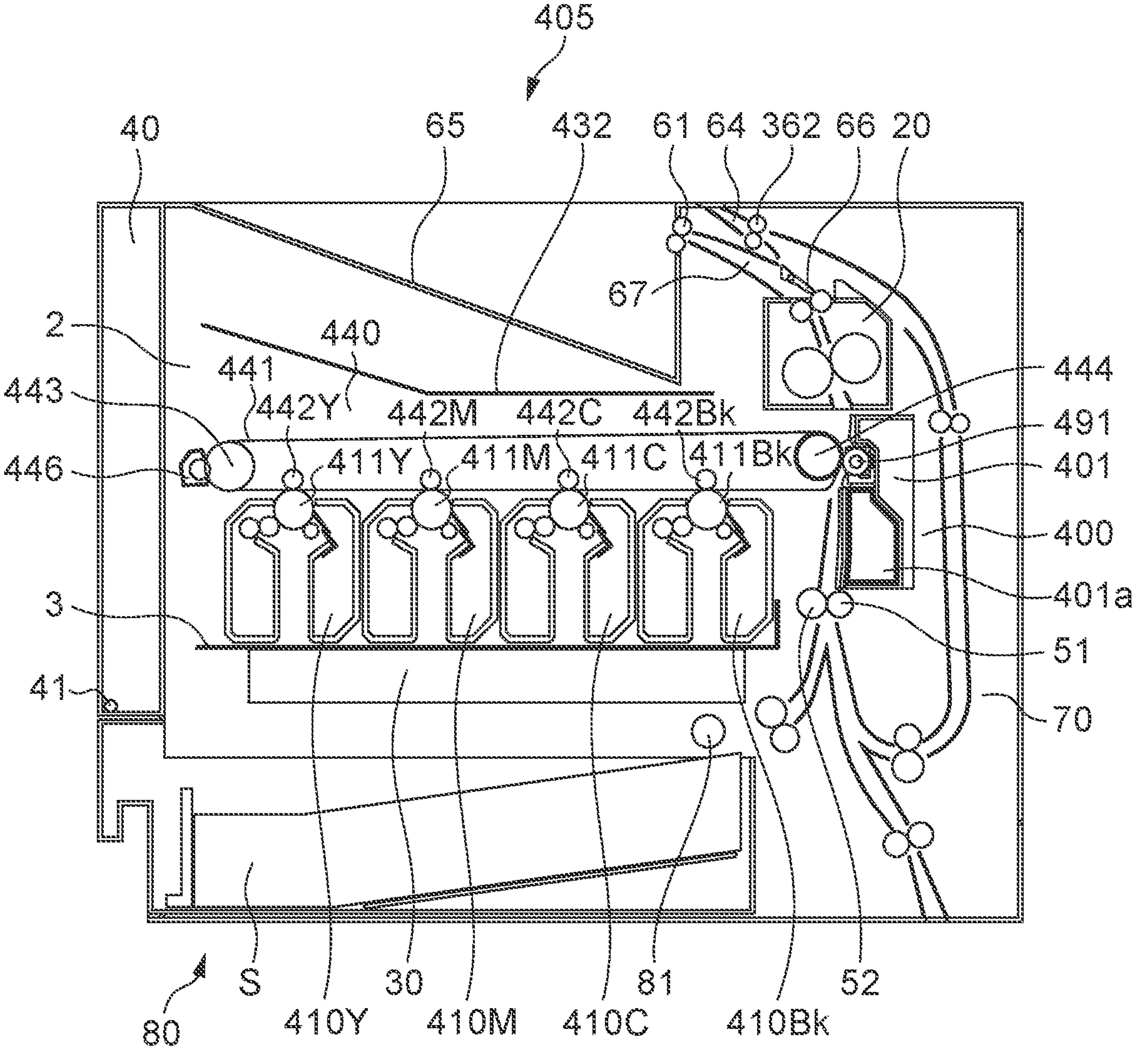
FIG. 16 is a view illustrating an overall configuration of an image forming apparatus according to a fourth exemplary embodiment.

With reference to FIG. 16, an overall configuration of an image forming apparatus 405 will be schematically described. FIG. 16 is a cross-sectional view illustrating an overall configuration of a color laser beam printer, which is an example of the image forming apparatus 405 according to the present exemplary embodiment. The laser scanner unit 30 for forming an electrostatic latent image on each of photosensitive drums 411 is disposed on a lower stage frame 3 of the image forming apparatus 405 illustrated in FIG. 16. Above the lower stage frame 3, process cartridges 410 (410Y, 410M, 410C, and 410Bk) are disposed. Above the process cartridges 410, an intermediate transfer unit 440 is disposed to oppose the process cartridges 410.

The intermediate transfer unit 440 includes an intermediate transfer belt 441 serving as an image bearing member. Inside the intermediate transfer belt 441, the intermediate transfer unit 440 includes primary transfer rollers 442 (442Y, 442M, 442C, and 442Bk), a tension roller 443, and a secondary transfer opposing roller 444. The intermediate transfer unit 440 further includes a cleaning unit 446 outside the intermediate transfer belt 441. A core frame unit 400 is disposed to the right of the intermediate transfer unit 440 in FIG. 16.

The core frame unit 400 includes a core frame 401 and fixed to the left frame 2. The core frame 401 includes a secondary transfer roller 491 opposing the secondary transfer opposing roller 444. An upper stage frame 432 is disposed above the intermediate transfer unit 440. The front door 40 is disposed to the left of the process cartridges 410 in FIG. 16, and is rotatable with the front door rotation center 41 as an axis.

The fixing unit 20 is disposed above the core frame unit 400. The duplex switching flapper 66 is disposed above the fixing unit 20. A switchback roller pair 362 and the sheet discharge roller pair 61 are disposed to the left of the duplex switching flapper 66 in FIG. 16. The duplex conveyance path 70 is disposed to the right of the core frame unit 400 in FIG. 16. A CPU is included in an image forming control unit (not illustrated) of the image forming apparatus 405, and comprehensively controls the image forming operation of the image forming apparatus 405.

Figure 17:
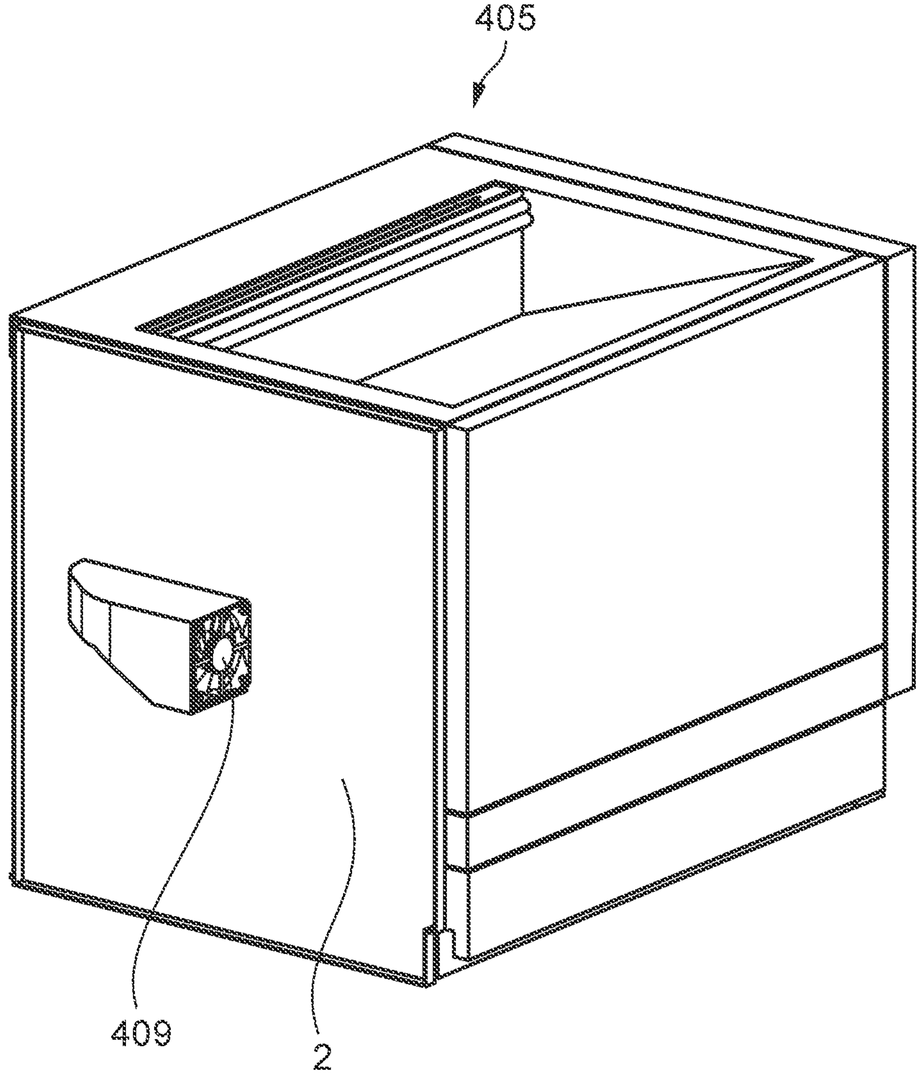
FIG. 17 is a perspective view illustrating the image forming apparatus according to the fourth exemplary embodiment with an outer casing removed therefrom.
Figure 18:
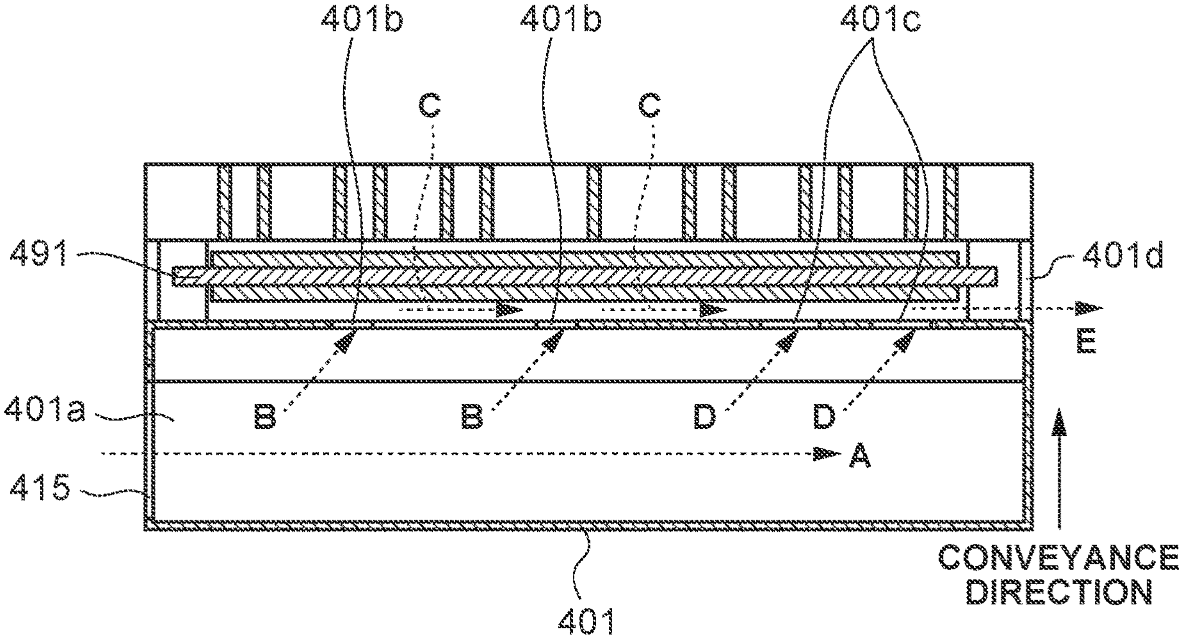
FIG. 18 is a cross-sectional view illustrating a core frame according to the fourth exemplary embodiment.

FIG. 17 is a perspective view of the image forming apparatus 405 with an outer casing on the left side removed therefrom. A fan 409 is provided on the left frame 2 to send air into a duct 401*a* through an inflow port 415 (see FIG. 18). The duct 401*a* flows the air sent from the fan 409 along the shaft direction of the secondary transfer roller 491, and is adjacent to the secondary transfer roller 491. FIG. 18 is a cross-sectional view of the core frame 401 seen from a direction perpendicular to the conveyance direction of the sheet S. An air flow state is similar to those according to the first to third exemplary embodiments. Holes 401*b*, holes 401*c*, and a discharge portion 401*d* respectively correspond to the holes 101*b*, the holes 101*c*, and the discharge portion 101*d* according to the first exemplary embodiment.

Printing Operation

Referring to FIG. 16, a user places the sheets S in the sheet feed cassette 80, and instructs the image forming apparatus 405 to start a printing operation. At this time, the fan 409 starts rotating in order to cool down the photosensitive drums 411 (411Y, 411M, 411C, and 411Bk) that rise in temperature during the printing operation. The sheet S (the recording material) is fed by the pickup roller 81 from the sheet feed cassette 80, reaches the conveyance roller 51 and the conveyance opposing roller 52, and is further conveyed by rotation of the conveyance roller 51 and the conveyance opposing roller 52.

At this time, toner images are respectively developed by the process cartridges 410 and sequentially transferred onto the intermediate transfer belt 441 in synchronization with the operation of feeding the sheet S. The sheet S is conveyed by the conveyance roller 51 and the conveyance opposing roller 52, and enters into a nip portion formed by the secondary transfer opposing roller 444 and the secondary transfer roller 491.

The toner images developed in an overlapping manner on the intermediate transfer belt 441 (which are also collectively referred to as a developing material image or a color image) are transferred onto the sheet S at timing corresponding to the timing when the sheet S enters into the nip portion. The color image transferred to the sheet S is heated and pressed by the fixing unit 20 including a fixing roller, whereby the toner is melted and fixed on the sheet S. The printing methods in the one-sided printing and the two-sided printing are similar to those according to the first to third exemplary embodiments, and thus descriptions thereof will be omitted.

In the present exemplary embodiment, the secondary transfer roller 491 cooled down by the sent air cools down the intermediate transfer belt 441 in contact therewith. The intermediate transfer belt 441 then cools down the photosensitive drums 411 (411Y, 411M, 411C, and 411Bk) in contact therewith. The secondary transfer roller 491 also cools down the sheet S being conveyed.

Figure 19:
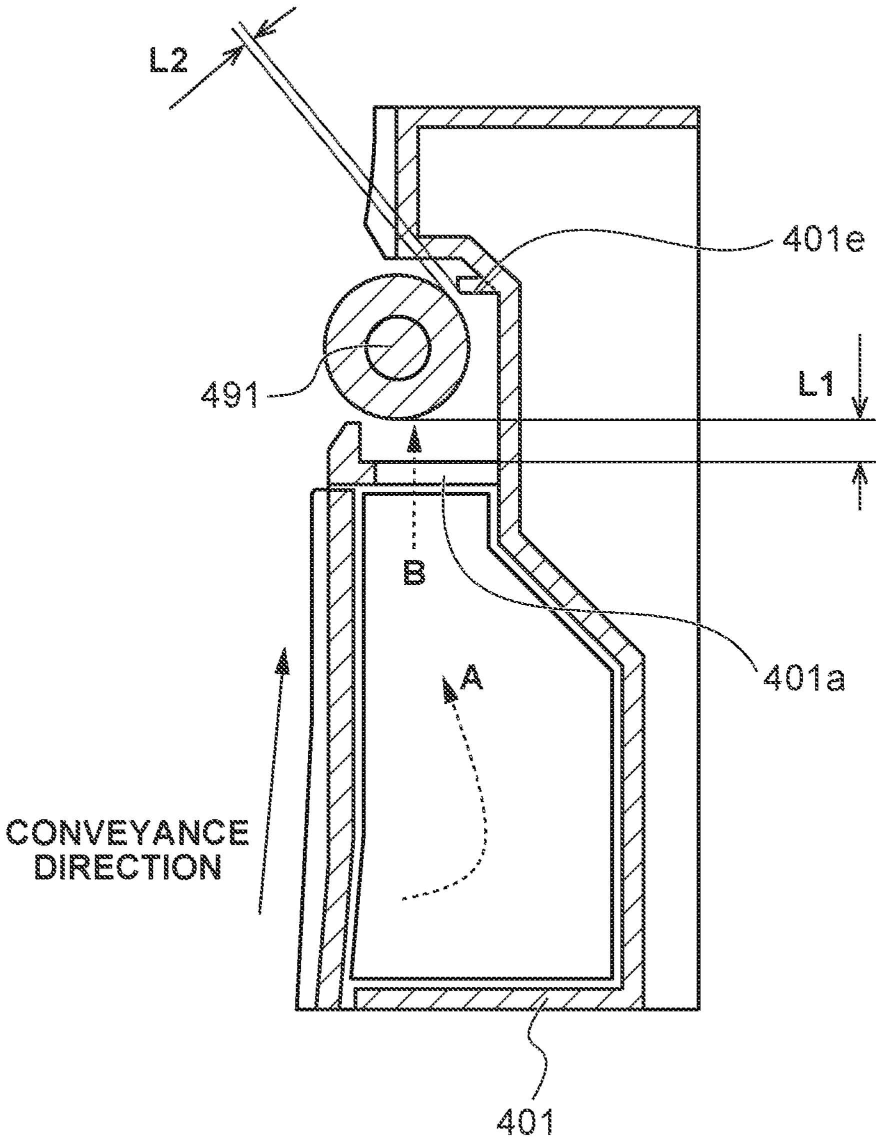
FIG. 19 is another cross-sectional view illustrating the core frame according to the fourth exemplary embodiment.

FIG. 19 is a cross-sectional view illustrating the core frame 401 seen in a direction perpendicular to the shaft of the secondary transfer roller 491. Similarly to the first to third exemplary embodiments, a windshield wall 401*e* is provided in the core frame 401, and a relationship between the distances L1 and L2 is also similar to those in the first exemplary embodiment to the third exemplary embodiment.

Similarly to the core frame 101 in FIG. 8 according to the first exemplary embodiment, the core frame 401 can include a rectifying plate shape. A description thereof will be omitted because the configuration is similar to that according to the first exemplary embodiment. In this manner, an exemplary embodiment of the present disclosure can also be applied to a color laser beam printer.

As described above, any of the first to fourth exemplary embodiments can efficiently send air to a transfer roller and cool down the transfer roller.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-086501, filed May 27, 2022, which is hereby incorporated by reference herein in its entirety.

What is claimed is:

1. An image forming apparatus for forming an image on a sheet, the image forming apparatus comprising:

a rotatable image bearing member configured to bear a toner image;

a transfer roller configured to transfer the toner image from the rotatable image bearing member onto the sheet;

a fan; and a duct extending in a parallel direction to a shaft direction of the transfer roller, wherein the duct includes an inflow port on a first end side of the duct in the parallel direction and is configured to guide, from the first end side to a second end side of the duct, air that has flowed into the duct through the inflow port, wherein the duct further includes, in an area opposing the transfer roller, a first opening portion that is provided at a position closer to the first end side than to the second end side, and a second opening portion that is provided at a position closer to the second end side than to the first end side, in the parallel direction, wherein the air supplied to the duct by the fan through the inflow port passes through the first opening portion and the second opening portion, and is supplied to the transfer roller, wherein the duct further includes a sheet guide portion of which an outer surface forms a part of a conveyance path for conveying the sheet, and wherein the sheet guide portion is located upstream of the transfer roller in a conveyance direction of the sheet.

2. The image forming apparatus according to claim 1, wherein the transfer roller is rotatable while being in contact with the rotatable image bearing member.

3. The image forming apparatus according to claim 2, wherein a first end of the duct is located at a position farther from a second end of the duct than a first end of the transfer roller in the parallel direction, and the second end of the duct is located at a position farther from the first end of the duct than a second end of the transfer roller in the parallel direction.

4. The image forming apparatus according to claim 1, wherein each of the first opening portion and the second opening portion has two or more holes.

5. The image forming apparatus according to claim 4, wherein a total area of the two or more holes of the second opening portion is larger than a total area of the two or more holes of the first opening portion.

6. The image forming apparatus according to claim 1, wherein the duct further includes a slope portion configured to guide, toward the second opening portion or the first opening portion, the air that has flowed into the duct through the inflow port.

7. An image forming apparatus for forming an image on a sheet, the image forming apparatus comprising:

a rotatable image bearing member configured to bear a toner image;

a transfer roller configured to transfer the toner image from the rotatable image bearing member onto the sheet;

a fan; and a duct extending in a parallel direction to a shaft direction of the transfer roller, and including a discharge portion configured to discharge air that has flowed into the duct, wherein the duct further includes, in an area opposing the transfer roller, a first opening portion that is provided at a position closer to a first end side of the duct than to a second end side of the duct, and a second opening portion that is provided at a position closer to the second end side than to the first end side, in the parallel direction, wherein air supplied into the image forming apparatus by the fan passes the transfer roller, enters into the duct through the first opening portion and the second opening portion, and is discharged from inside the duct through the discharge portion, wherein the duct further includes a sheet guide portion of which an outer surface forms a part of a conveyance path for conveying the sheet, and wherein the sheet guide portion is located upstream of the transfer roller in a conveyance direction of the sheet.

8. The image forming apparatus according to claim 7, wherein the transfer roller is rotatable while being in contact with the rotatable image bearing member.

9. The image forming apparatus according to claim 8, wherein a first end of the duct is located at a position farther from a second end of the duct than a first end of the transfer roller in the parallel direction, and the second end of the duct is located at a position farther from the first end of the duct than a second end of the transfer roller in the parallel direction.

10. The image forming apparatus according to claim 7, wherein each of the first opening portion and the second opening portion has two or more holes.

11. The image forming apparatus according to claim 10, wherein a total area of the two or more holes of the second opening portion is larger than a total area of the two or more holes of the first opening portion.

* * * * *